United States Patent Office 3,347,900
Patented Oct. 17, 1967

3,347,900
PROCESS FOR PREPARING UNSATURATED NITRILES
Helmut Gössel and Rudolf Wirtz, Frankfurt am Main, and Hans Fernholz, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Apr. 21, 1965, Ser. No. 449,865
Claims priority, application Germany, May 9, 1964, F 42,838
9 Claims. (Cl. 260—465.3)

ABSTRACT OF THE DISCLOSURE

Preparation of olefinic nitriles by reaction of olefin with HCN and oxygen at 0 to 200° C. and 2 to 300 atmospheres pressure in the presence of 0.1 to 15% by weight of a noble metal as catalyst.

In general, unsaturated nitriles are prepared according to the following processes:

(a) Reaction of alkynes with hydrogen cyanide

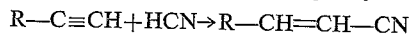
R—C≡CH+HCN→R—CH=CH—CN (b) Splitting off of water from nitriles of hydroxyacids

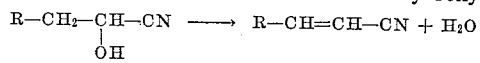
R—CH₂—CH—CN ⟶ R—CH=CH—CN + H₂O
         |
         OH (c) Splitting off of water from cyanhydrins

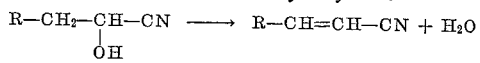
R—CH₂—CH—CN ⟶ R—CH=CH—CN + H₂O
         |
         OH (d) Splitting off of water from amides of unsaturated acids

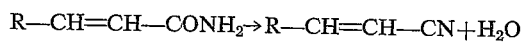
R—CH=CH—CONH₂→R—CH=CH—CN+H₂O (e) Reaction of propylene with ammonia and air with the aid of catalysts at a temperature in the range of from 300 to 500° C. to acrylonitrile.

The processes specified sub (a)–(d) have the important drawback that they are very uneconomic owing to the relatively high price of the starting products. As compared therewith the process indicated sub (e) uses a starting product (propylene) which is readily obtainable in large amounts in petrochemistry, but this product must be reacted at relatively high temperatures of above 300° C. with ammonia and air to yield acrylonitrile. A further disadvantage of the latter process resides in that varying amounts of acetonitrile and hydrogen cyanide are obtained as byproducts.

It has now been found that the aforesaid disadvantages can be avoided and unsaturated nitriles can be prepared by reacting olefins with hydrogen cyanide and oxygen under pressure and in the presence of a catalyst.

In view of the fact that olefins, particularly ethylene and propylene, can be readily produced by petrochemical processes, the reaction according to the invention is of great importance. For carrying out the process according to the invention the catalyst is used in the form of a fixed bed catalyst or in the form of a suspension in an inert liquid. The reaction is carried out in an autoclave wherein the reaction mixture consisting of the olefin, air or oxygen and anhydrous hydrogen cyanide is contacted with the catalyst under a pressure of 2 to 300 atmospheres, preferably 5 to 150 atmospheres. The reaction takes place at a high speed and at a temperature in the range of from 0 to 200° C., preferably 10 to 120° C. With the use of a fixed bed catalyst the nitriles formed are obtained by condensation and with the use of a catalyst suspension they are isolated from the liquid by distillation. The recovered gas mixture is again admixed with air or oxygen and reconducted into the reactor.

According to the process of the invention preferably olefins with 2 to 20 carbon atoms are transformed into the corresponding nitriles, especially ethylene, propylene, butylene and pentene. The amount of olefins used as well as the amount of air or oxygen can be varied within wide limits and advantageously depend on the limits of explosion with the olefins and the hydrogen cyanide used.

As catalysts there come into consideration the metals of sub-group eight of the second and third great period of the Periodic Table such as ruthenium, rhodium, palladium, osmium, iridium, and platinum, and particularly palladium. As additional auxiliary an alkali metal or alkaline earth metal cyanide may be added. It is of advantage to support the catalysts on carriers, such as, for example, carbon, pumice, aluminium silicates, as bentonites, zeolites, montmorillonites, silicium carbide, aluminium oxide and silica gel.

The content of noble metal advantageously amounts to 0.1 to 15% and more advantageously 1 to 10%, calculated on the total weight of the catalyst and carrier. The process can be carried out discontinuously in an autoclave or continuously in a pressure reactor with circulation of the residual gas. When the process is conducted discontinuously in an autoclave, it is of advantage to use a solvent. Particularly suitable are polar organic liquids which do not react with the formed nitriles, for example acetonitrile, propionitrile, acrylonitrile and benzonitrile. There may also be used dimethyl formamide, chlorobenzene and dimethyl sulfoxide. When the process is carried out with circulation of the gas, oxygen and hydrogen cyanide, which should be present in a slight excess, must be replenished continuously, because they are consumed in the reaction, whereas the olefin, owing to the limits of explosion, is always present in an excess. In the former case the nitrile formed is separated from the solvent by fractional distillation and in the latter case it is isolated from the issuing gas mixture by condensation in a cooling vessel. The hydrogen cyanide in excess is then likewise condensed. It is separated from the nitrile and recovered by moderately heating the cooling vessel. The yield of nitrile depends on the oxygen content of the gas and partially on the solvent used. In general, high yields are obtained, calculated on the amount of oxygen used.

The process according to the invention has the great advantages that olefins can be used as starting materials which are readily obtainable by a petrochemical process and that the nitriles can be produced at relatively low temperatures in the range of from 0 to 200° C., for example at room temperature, with very good space-time yields.

The following examples serve to illustrate the invention but they are not intended to limit it thereto.

Example 1

An autoclave was charged with 200 parts by volume of a catalyst consisting of bentonite with a content of 5% by weight of palladium, prepared by impregnating the bentonite with palladium chloride in a solution with hydrochloric acid, reduction of the palladium salt with hydrazine and washing until the wash water was free from chlorine ions, 5 parts by weight of potassium cyanide, 10 parts by weight of anhydrous hydrogen cyanide and 200 parts of acetonitrile as solvent. The solvent was saturated with ethylene and 40 atmospheres of ethylene and 40 atmospheres of air were forced in so that the total pressure amounted to 80 atmospheres. After having shaken the content of the autoclave for 10 minutes, the pressure remained constant and the reaction was terminated, the fall in pressure being 20 atmospheres. 9 parts by weight of acrylonitrile were isolated by distillation. The catalyst could be reused at once.

*Example 2*

The catalyst used consisted of active carbon and 5% by weight of palladium metal and had been prepared as described in Example 1 with the exception that the palladium salt was reduced with hydrogen in a solution with acetic acid. 15 parts by weight of the catalyst were washed into an autoclave with 380 parts by weight of propionitrile as solvent. After the addition of 10 parts by weight of hydrogen cyanide the solvent was saturated with ethylene and 40 atmospheres of ethylene and 40 atmospheres of air were forced in. The reaction started at once and was terminated after 5 minutes. 10 parts by weight of acrylonitrile were obtained by distillation.

*Example 3*

An autoclave was charged with 200 parts by volume of a catalyst consisting of pumice and 7% by weight of palladium and prepared as described in Example 1, 200 parts of propionitrile, 5 parts by weight of potassium cyanide and 10 parts by weight of hydrogen cyanide. The solvent was saturated with ethylene and then 20 atmospheres of ethylene and 20 atmospheres of air were forced in. The reaction started at once at room temperature and was terminated after 10 minutes. 5 parts by weight of acrylonitrile were isolated. The catalyst could be reused at once.

We claim:

1. A process for preparing acrylonitrile which comprises reacting ethylene with hydrogen cyanide and oxygen at a temperature of 0 to 200° C. and a pressure of 2 to 300 atmospheres in the presence of a noble metal as catalyst.

2. A process as defined in claim 1 wherein the reaction is carried out in an inert polar solvent.

3. A process as defined in claim 2 wherein the solvent is acetonitrile, propionitrile, acrylonitrile, benzonitrile, dimethyl formamide, chlorobenzene or dimethyl sulfoxide.

4. A process as defined in claim 1 wherein the reaction is carried out in the gaseous phase.

5. A process as defined in claim 1 wherein the noble metal is supported on a carrier and the concentration of said noble metal on said carrier is from 0.1 to 15% by weight.

6. A process as defined in claim 5 wherein the concentration of said noble metal on the carrier is from .1 to 10% by weight.

7. A process as defined in claim 1 wherein the catalyst is palladium.

8. A process as defined in claim 1 wherein the catalyst is supplemented by an alkali metal cyanide or alkaline earth metal cyanide.

9. A process for preparing acrylontirile which comprises reacting ethylene with hydogen cyanide and oxygen at a temperature of 10 to 120° C. and a pressure of 5 to 150 atmospheres in the presence of palladium as catalyst.

References Cited

UNITED STATES PATENTS

| | | | |
|---|---|---|---|
| 3,278,576 | 10/1966 | Davis | 260—465.3 |
| 3,282,981 | 11/1966 | Davis | 260—465.3 |
| 3,297,742 | 1/1967 | Monroe et al. | 260—465.3 |

JOSEPH P. BRUST, *Primary Examiner.*